United States Patent
Thomas et al.

(10) Patent No.: US 10,083,056 B2
(45) Date of Patent: Sep. 25, 2018

(54) SESSION TRANSFER AND SUSPENSION IN A REMOTE ACCESS APPLICATION FRAMEWORK

(71) Applicant: Calgary Scientific Inc., Calgary (CA)

(72) Inventors: Monroe M. Thomas, Toronto (CA); David Christopher Claydon, Calgary (CA)

(73) Assignee: Calgary Scientific Inc., Calgary, AB (CA)

( * ) Notice: Subject to any disclaimer, the term of this patent is extended or adjusted under 35 U.S.C. 154(b) by 165 days.

(21) Appl. No.: 15/054,458

(22) Filed: Feb. 26, 2016

(65) Prior Publication Data

US 2016/0253199 A1 Sep. 1, 2016

Related U.S. Application Data

(63) Continuation of application No. 13/672,856, filed on Nov. 9, 2012, now Pat. No. 9,294,572.

(Continued)

(51) Int. Cl.
*H04L 29/00* (2006.01)
*G06F 9/455* (2018.01)
(Continued)

(52) U.S. Cl.
CPC ........ *G06F 9/45558* (2013.01); *H04L 63/083* (2013.01); *H04L 67/02* (2013.01);
(Continued)

(58) Field of Classification Search
CPC .... G06F 9/45558; H04L 63/083; H04L 67/02
(Continued)

(56) References Cited

U.S. PATENT DOCUMENTS

| 5,249,121 A | 9/1993 | Baum |
| 5,870,559 A * | 2/1999 | Leshem ................ G06F 11/32 |
| | | 707/E17.116 |

(Continued)

FOREIGN PATENT DOCUMENTS

| CA | 2646414 | 10/2007 |
| CA | 2697936 | 3/2009 |

(Continued)

OTHER PUBLICATIONS

Hong, C., "Multimedia Presentation Authoring and Virtual Collaboration in Medicine," International Journal of Kimics, vol. 8, No. 6, 2010, pp. 690-696.

(Continued)

*Primary Examiner* — Brandon Hoffman
*Assistant Examiner* — Michael D Anderson
(74) *Attorney, Agent, or Firm* — Meunier Carlin & Curfman LLC (57) ABSTRACT

Systems and method for providing for suspension and transfer of remote access sessions. In accordance with the methods, a request to suspend a session may be received at a server tier. The server tier prepares a URL that may be used at a later time by a client to resume the session. The URL is communicated to a client tier from which the request was received and, thereafter, a connection between the client tier and the server tier is closed. At a subsequent time, a request may be received to resume the session at the URL. After receipt of the request to resume the session, a connection with the requesting client tier is established by the server tier, and the session is resumed.

16 Claims, 9 Drawing Sheets

Related U.S. Application Data (60) Provisional application No. 61/559,007, filed on Nov. 11, 2011.

(51) Int. Cl.
*H04L 29/08* (2006.01)
*H04L 29/06* (2006.01)

(52) U.S. Cl.
CPC .......... *H04L 67/142* (2013.01); *H04L 67/148* (2013.01); *H04L 67/42* (2013.01); *G06F 2009/45575* (2013.01); *G06F 2009/45595* (2013.01)

(58) Field of Classification Search
USPC .......................................................... 726/7
See application file for complete search history.

(56) References Cited

U.S. PATENT DOCUMENTS

| | | |
|---|---|---|
| 6,151,621 A | 11/2000 | Colyer et al. |
| 6,342,906 B1 | 1/2002 | Kumar et al. |
| 6,602,185 B1 | 8/2003 | Uchikubo |
| 6,662,210 B1 | 12/2003 | Carleton et al. |
| 6,698,021 B1 | 2/2004 | Amini et al. |
| 6,742,015 B1 | 5/2004 | Bowman-Amuah |
| 6,763,371 B1 | 7/2004 | Jändel |
| 6,938,212 B2 | 8/2005 | Nakamura |
| 6,981,062 B2 | 12/2005 | Suryanarayana |
| 6,996,605 B2 | 2/2006 | Low et al. |
| 7,003,550 B1 | 2/2006 | Cleasby et al. |
| 7,133,895 B1 | 11/2006 | Lee et al. |
| 7,152,092 B2 | 12/2006 | Beams et al. |
| 7,191,233 B2 | 3/2007 | Miller |
| 7,197,561 B1 | 3/2007 | Lovy et al. |
| 7,254,634 B1 | 8/2007 | Davis et al. |
| 7,287,054 B2 | 10/2007 | Lee et al. |
| 7,346,616 B2 | 3/2008 | Ramanujam et al. |
| 7,356,563 B1 | 4/2008 | Leichtling et al. |
| 7,363,342 B1 | 4/2008 | Wang et al. |
| 7,484,208 B1 | 1/2009 | Nelson |
| 7,533,146 B1 | 5/2009 | Kumar |
| 7,624,185 B2 | 11/2009 | Miller et al. |
| 7,676,506 B2 | 3/2010 | Reinsch |
| 7,810,089 B2 | 10/2010 | Sundarrajan et al. |
| 7,950,026 B1 | 5/2011 | Urbach |
| 7,984,115 B2 | 7/2011 | Tien et al. |
| 8,010,901 B1 | 8/2011 | Rogers |
| 8,065,166 B2 | 11/2011 | Maresh et al. |
| 8,122,341 B1 | 2/2012 | Dayan et al. |
| 8,195,146 B2 | 6/2012 | Prakash et al. |
| 8,239,773 B1 | 8/2012 | Billman |
| 8,478,307 B1 | 7/2013 | Hayes |
| 8,527,591 B2 | 9/2013 | Pirnazar |
| 8,615,579 B1 * | 12/2013 | Vincent ................. G06F 9/4856 709/223 |
| 8,856,259 B2 | 10/2014 | Burckart et al. |
| 8,909,703 B2 | 12/2014 | Gupta et al. |
| 8,935,328 B2 | 1/2015 | Tumuluri |
| 2001/0037358 A1 | 11/2001 | Clubb et al. |
| 2002/0051541 A1 | 5/2002 | Glick et al. |
| 2003/0179230 A1 | 9/2003 | Seidman |
| 2004/0045017 A1 | 3/2004 | Dorner et al. |
| 2004/0249885 A1 | 12/2004 | Petropoulakis et al. |
| 2005/0114711 A1 | 5/2005 | Hesselink et al. |
| 2005/0114789 A1 | 5/2005 | Chang et al. |
| 2005/0154288 A1 | 7/2005 | Wang |
| 2005/0246422 A1 | 11/2005 | Laning |
| 2006/0041891 A1 | 2/2006 | Aaron |
| 2006/0053380 A1 | 3/2006 | Spataro et al. |
| 2006/0085245 A1 | 4/2006 | Takatsuka et al. |
| 2006/0112188 A1 | 5/2006 | Albanese et al. |
| 2006/0179119 A1 | 8/2006 | Kurosawa et al. |
| 2006/0221081 A1 | 10/2006 | Cohen et al. |
| 2006/0242254 A1 | 10/2006 | Okazaki et al. |
| 2007/0143398 A1 | 6/2007 | Graham |
| 2007/0244930 A1 | 10/2007 | Bartlette et al. |
| 2007/0244962 A1 | 10/2007 | Laadan et al. |
| 2008/0028323 A1 | 1/2008 | Rosen et al. |
| 2008/0052377 A1 | 2/2008 | Light |
| 2008/0195362 A1 | 8/2008 | Belcher et al. |
| 2008/0320081 A1 | 12/2008 | Shriver-Blake et al. |
| 2009/0070404 A1 | 3/2009 | Mazzaferri |
| 2009/0094369 A1 | 4/2009 | Woolbridge et al. |
| 2009/0106422 A1 | 4/2009 | Kriewall |
| 2009/0172100 A1 | 7/2009 | Callanan et al. |
| 2009/0187817 A1 | 7/2009 | Ivashin et al. |
| 2010/0017727 A1 | 1/2010 | Offer et al. |
| 2010/0115023 A1 | 5/2010 | Peled |
| 2010/0131591 A1 | 5/2010 | Thomas et al. |
| 2010/0274858 A1 | 10/2010 | Lindberg et al. |
| 2010/0306642 A1 | 12/2010 | Lowet |
| 2011/0047190 A1 | 2/2011 | Lee et al. |
| 2011/0058052 A1 | 3/2011 | Bolton |
| 2011/0119716 A1 | 5/2011 | Coleman, Sr. |
| 2011/0128378 A1 | 6/2011 | Raji |
| 2011/0154302 A1 | 6/2011 | Balko et al. |
| 2011/0187652 A1 | 8/2011 | Huibers |
| 2011/0191438 A1 | 8/2011 | Huibers et al. |
| 2011/0191823 A1 | 8/2011 | Huibers |
| 2011/0219419 A1 | 9/2011 | Reisman |
| 2012/0072833 A1 | 3/2012 | Song et al. |
| 2012/0159308 A1 | 6/2012 | Tseng et al. |
| 2012/0159356 A1 | 6/2012 | Steelberg |
| 2012/0169874 A1 | 7/2012 | Thomas et al. |
| 2012/0210242 A1 | 8/2012 | Burckart et al. |
| 2012/0210243 A1 | 8/2012 | Uhma et al. |
| 2012/0233555 A1 | 9/2012 | Psistakis et al. |
| 2012/0331061 A1 | 12/2012 | Lininger |
| 2013/0046815 A1 | 2/2013 | Thomas et al. |
| 2013/0086155 A1 | 4/2013 | Thomas et al. |
| 2013/0086156 A1 | 4/2013 | McFadzean et al. |
| 2013/0120368 A1 | 5/2013 | Miller |
| 2013/0132485 A1 | 5/2013 | Thomas et al. |
| 2013/0159709 A1 | 6/2013 | Ivory et al. |
| 2013/0208966 A1 | 8/2013 | Zhao et al. |
| 2013/0297676 A1 | 11/2013 | Binyamin |
| 2014/0053085 A1 | 2/2014 | Stephure et al. |
| 2014/0207858 A1 | 7/2014 | Thomas et al. |
| 2014/0258441 A1 | 9/2014 | L'Heureux et al. |

FOREIGN PATENT DOCUMENTS

| | | |
|---|---|---|
| CA | 2742779 | 6/2010 |
| EP | 1015068 | 4/2008 |
| EP | 2761808 | 8/2014 |
| WO | 1998/025666 | 6/1998 |
| WO | 2001/091482 | 11/2001 |
| WO | 2008/011063 | 1/2008 |
| WO | 2012/093330 | 7/2012 |
| WO | 2013/046015 | 4/2013 |
| WO | 2013/046016 | 4/2013 |
| WO | 2013/076554 | 5/2013 |
| WO | 2014/033554 | 3/2014 |

OTHER PUBLICATIONS

Layers: Capture Every Item on Your Screen as a PSD Layered Image, Internet Website, retrieved on Jun. 30, 2016 at http://web.archive.org/web/20140218111143, 2014, 9 pages.

Shim, H.S., et al., "Providing Flexible Services for Managing Shared State in Collaborative Systems," Proceedings of the Fifth European Conference on Computer Supported Cooperative Work, 1997, pp. 237-252.

International Search Report and Written Opinion, dated Jul. 8, 2016, received in connection with International Patent Application No. PCT/IB2016/051856.

ADASS XXI Conference Schedule, European Southern Observatory, http://www.eso.org/sci/meetings/2011/adass2011/program/schedule.html#day2, Nov. 7, 2011, 4 pages.

(56) References Cited

OTHER PUBLICATIONS

"Calgary Scientific Revolutionizes Application Sharing and Advanced Collaboration with PureWeb 3.0," Press Release, Jun. 21, 2011, 3 pages.
Federl, P., "Remote Visualization of Large Multi-dimensional Radio Astronomy Data Sets," Institute for Space Imaging Science, University of Calgary, 2012, 22 pages.
GoInstant, Shared Browsing Technology, http://website.s3.goinstant.com.s3.amazonaws.com/wp-content/uploads/2012/04/GoInstant-Shared-Web-Technology.pdf, 2012, 4 pages.
Li, S.F., et al., "Integrating Synchronous and Asynchronous Collaboration with Virtual Network Ccomputing," Internet Computing, IEEE 4.3, 2000, pp. 26-33.
Luo, Y., et al., "Real Time Multi-User Interaction with 3D Graphics via Communication Networks," 1998 IEEE Conference on Information Visualization, 1998, 9 pages.
Samesurf web real-time co-browser application, http://i.samesurf.com/i/0586021 2009, 2 pages.
Yang, L., et al., "Multirate Control in Internet-Based Control Systems," IEEE Transactions on Systems, Man, and Cybernetics: Part C: Applications and Reviews, vol. 37, No. 2, 2007, pp. 185-192.
European Search Report, dated Apr. 10, 2015, received in connection with European Application No. 12837201.8.
European Search Report, dated Jun. 12, 2014, received in connection with European Application No. 12731899.6.
International Preliminary Report on Patentability and Written Opinion, dated May 27, 2014, received in connection with International Patent Application No. PCT/IB2012/002417.
International Search Report and Written Opinion, dated Feb. 12, 2013, in connection with International Patent Application No. PCT/IB2012/002417.
International Preliminary Report on Patentability and Written Opinion, dated Feb. 17, 2015, received in connection with related International Patent Application No. PCT/IB2013/002776.
International Search Report and Written Opinion, dated Jun. 9, 2014, received in connection with International Patent Application No. PCT/IB2013/002776.
International Preliminary Report on Patentability and Written Opinion, dated May 13, 2014, received in connection with International Patent Application No. PCT/IB2012/002842.
International Search Report and Written Opinion, dated May 17, 2013, in connection with International Patent Application No. PCT/IB2012/002842.
International Preliminary Report on Patentability and Written Opinion, dated Apr. 4, 2014, received in connection with International Patent Application No. PCT/IB2012/001935.
International Search Report and Written Opinion, dated Jan. 30, 2013, in connection with International Patent Application No. PCT/IB2012/001935.
International Preliminary Report on Patentability and Written Opinion, dated Apr. 4, 2014, received in connection with International Patent Application No. PCT/IB2012/001931.
International Search Report and Written Opinion, dated Jan. 23, 2013, in connection with International Patent Application No. PCT/IB2012/001931.
International Preliminary Report on Patentability and Written Opinion, dated Jul. 10, 2013, received in connection with International Patent Application No. PCT/IB2012/000009.
International Search Report and Written Opinion, dated May 16, 2012, in connection with International Patent Application No. PCT/IB2012/000009.
Clark, C., et al., "Live Migration of Virtual Machines," NSDI'05 Proceedings of the $2^{nd}$ conference on Symposium on Networked Systems Design & Implementation, vol. 2, 2005, pp. 273-286.
Kozuch, M., et al., "Internet Suspend/Resume," Proceedings of the $4^{th}$ IEEE Workshop on Mobile Computing Systems and Applications (WMCSA'02), 2002, pp. 40-46.

* cited by examiner

SESSION TRANSFER AND SUSPENSION IN A REMOTE ACCESS APPLICATION FRAMEWORK

CROSS-REFERENCE TO RELATED APPLICATIONS

This application is a continuation of U.S. patent application Ser. No. 13/672,856, filed Nov. 9, 2012, entitled "SESSION TRANSFER AND SUSPENSION IN A REMOTE ACCESS APPLICATION FRAMEWORK" and also claims priority to U.S. Provisional Patent Application No. 61/559,007, filed Nov. 11, 2011, entitled "SESSION TRANSFER AND SUSPENSION IN A REMOTE ACCESS APPLICATION FRAMEWORK," which are incorporated herein by reference in their respective entireties.

BACKGROUND

Ubiquitous remote access to services, application programs and data has become commonplace as a result of the growth and availability of broadband and wireless network access. As such, users are accessing application programs and data using an ever-growing variety of client devices (e.g., mobile devices, table computing devices, laptop/notebook/desktop computers, etc.). Data may be communicated to the devices from a remote server over a variety of networks including, 3G and 3G mobile data networks, wireless networks such as WiFi and WiMax, wired networks, etc. Clients may connect to a server offering the services, applications programs and data across many disparate network bandwidths and latencies.

In such an environment, where the client devices do not perform true multitasking of multiple applications at the same time, remote sessions may be lost when a CPU cycle is disrupted or if time-outs occur. On mobile devices, which often contain a cellular telephone capability, it is desirable to be able to switch to another application (such as the telephone application or chat application) temporarily, and the resume working with the remote session. However, in so doing, the session may be lost. An additional problem is that running sessions may not be moved from one client device to another or from one server to another. Thus, a session may not be arbitrarily suspended and transferred without losing work.

SUMMARY

Disclosed herein are systems and methods for providing suspension and transfer of remote access sessions. In accordance with the methods, a request to suspend a session may be received at a server tier. The server tier prepares a URL that may be used at a later time by a client to resume the session. The URL is communicated to a client tier from which the request was received and, thereafter, a connection between the client tier and the server tier is closed. At a subsequent time, a request may be received to resume the session at the URL. After receipt of the request to resume the session, a connection with the requesting client tier is established by the server tier, and the session is resumed.

In some implementations, the server tier automatically suspends a session without a request from the client if there is a risk of losing a network connection. A resume URL maybe automatically communicated to the client tier if the connection is lost and re-established.

In accordance with some implementations, there is provided a method of suspending and resuming a remote access session in a tiered framework. The method may include receiving a request to suspend the session at a server tier; preparing, at the server tier, a URL to resume the session; communicating the URL to a client tier; closing a connection at the client tier with the server tier; and at a subsequent time, receiving a request to resume the session at the URL.

In accordance with some implementations, there is provided a method of suspending and resuming a remote access session in a tiered framework. The method may include suspending an application associated with the remote access session at a server tier; saving at least one of an application state model and application-related information associated with the application; preparing, at the server tier, a URL to resume the session; mapping the URL to the application; and communicating the URL to a client tier In accordance with some implementations, there is provided a tangible computer readable media containing computer-executable instructions that when executed by a computing device perform a method that may include receiving a request from a client tier to suspend an application executing on in a server tier; suspending the application at a server tier by saving at least one of an application state model and application-related information associated with the application; preparing a URL to resume the session that is mapped to the application; and communicating the URL to the client tier to enable the client tier to resume the application.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for remotely accessing applications, it will become evident to those skilled in the art that the implementations are not limited thereto, but are applicable for remotely accessing any type of data or service via a remote device.

Figure 1:
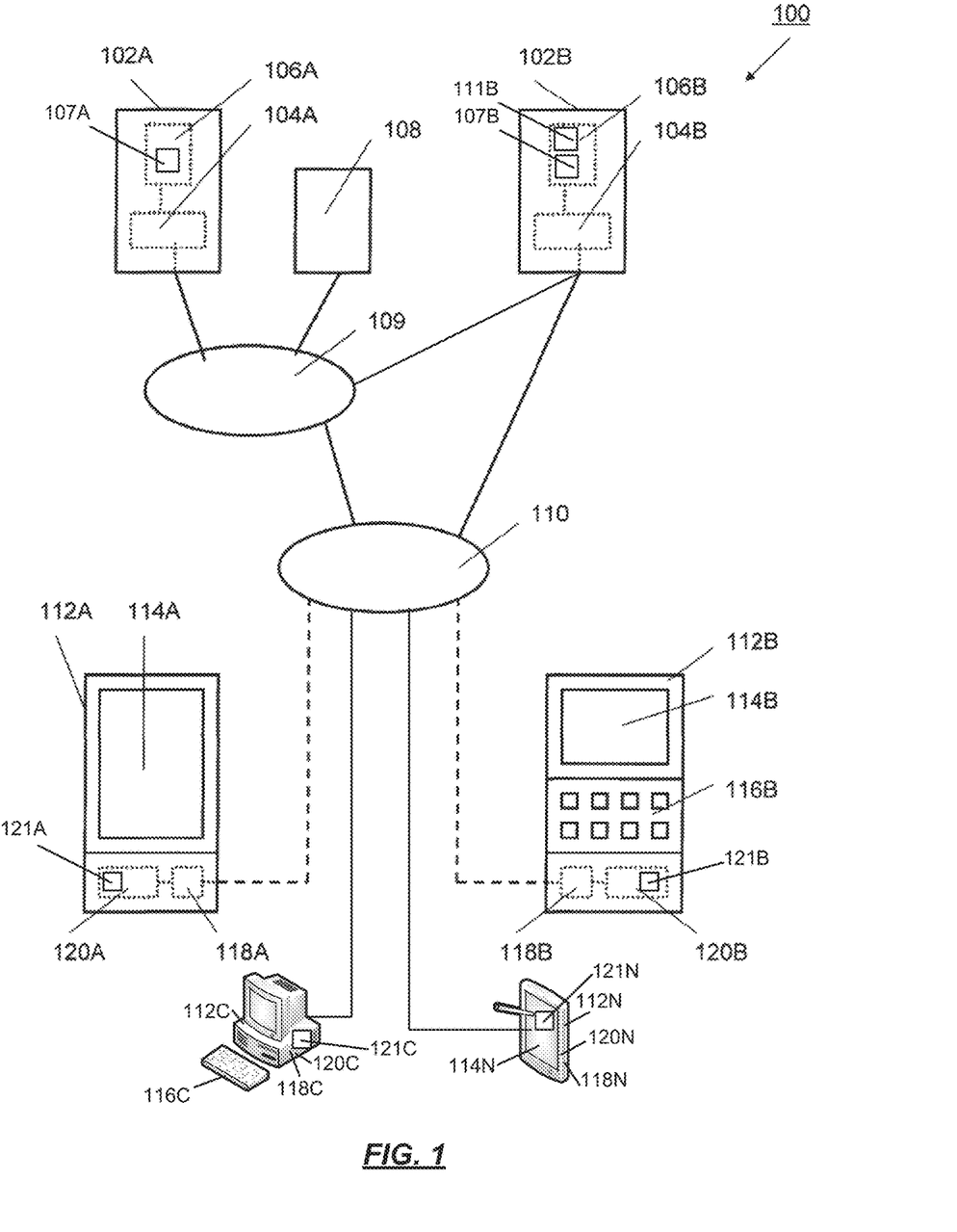
FIG. 1 is a simplified block diagram illustrating a system for providing remote access to an application at a remote device via a computer network.

Referring to FIG. 1, a system 100 for providing remote access to an application, data or other service via a computer network. The system comprises a client computer 112A or 112B, such as a wireless handheld device such as, for example, an IPHONE 112A or a BLACKBERRY 112B connected via a computer network 110 such as, for example, the Internet, to a server 102B. Similarly, the client computing devices may also include a desktop/notebook personal computer 112C or a tablet device 112N that are connected by the communication network 110 to the server 102B. It is noted that the connections to the communication network 110 may be any type of connection, for example, Wi-Fi (IEEE 802.11x), WiMax (IEEE 802.16), Ethernet, 3G, 4G, etc.

The server 102B is connected, for example, via the computer network 110 to a Local Area Network (LAN) 109 or may be directly connected to the computer network 110. For example, the LAN 109 is an internal computer network of an institution such as a hospital, a bank, a large business, or a government department. Typically, such institutions still use a mainframe computer 102A and a database 108 connected to the LAN 109. Numerous application programs 107A may be stored in memory 106A of the mainframe computer 102A and executed on a processor 104A. Similarly, numerous application programs 107B may be stored in memory 106B of the server 102B and executed on a processor 104B. The application programs 107A and 107B may be "services" offered for remote access. The mainframe computer 102A, the server 102B and the client computing devices 112A, 112B, 112C or 112N may be implemented using hardware such as that shown in the general purpose computing device of FIG. 6.

In some implementations, the application tier and server tier may be implemented within a cloud computing environment to provide remote access to the application programs 107A/107B. Cloud computing is a model for enabling network access to a shared pool of configurable computing resources (e.g., networks, servers, storage, applications, and services) that can be provisioned and released with minimal interaction. The cloud computing model promotes high availability, on-demand self-services, broad network access, resource pooling and rapid elasticity. In such an environment, the application programs 107A/107B may be accessed by the client computing devices 112A, 112B, 112C or 112N through a client interface, such as a client remote access application 121A, 121B, 121C, 121N, as described below.

As will be described, each of the client computing devices 112A, 112B, 112C or 112N may have different physical requirements and capabilities, however, the system 100 enable the delivery of an experience to each of the client computing devices 112A, 112B, 112C or 112N that is appropriate for the particular device and yet common to all devices.

The client remote access application 121A, 121B, 121C, 121N may be designed for providing user interaction for displaying data and/or imagery in a human comprehensible fashion and for determining user input data in dependence upon received user instructions for interacting with the application program using, for example, a graphical display with touch-screen 114A or a graphical display 114B/114N and a keyboard 116B/116C of the client computing devices 112A, 112B, 112C, 112N, respectively. For example, the client remote access application is performed by executing executable commands on processor 118A, 118B, 118C, 118N with the commands being stored in memory 120A, 120B, 120C, 120N of the client computer 112A, 112B, 112C, 112N, respectively.

Alternatively or additionally, a user interface program is executed on the server 102B (as one of application programs 107B) which is then accessed via an URL by a generic client application such as, for example, a web browser executed on the client computer 112A, 112B. The user interface is implemented using, for example, Hyper Text Markup Language HTML 5. In some implementations, the server 102B may participate in a collaborative session with the client computing devices 112A, 112B, 112C . . . 112N. For example, the aforementioned one of the application programs 107B may enable the server 102B to collaboratively interact with the application program 107A or another application program 107B and the client remote access applications 121A, 121B, 121C, 121N. As such, the server 102B and each of the participating client computing devices 112A, 112B, 112C . . . 112N may present a synchronized view of the display of the application program.

Figure 2:
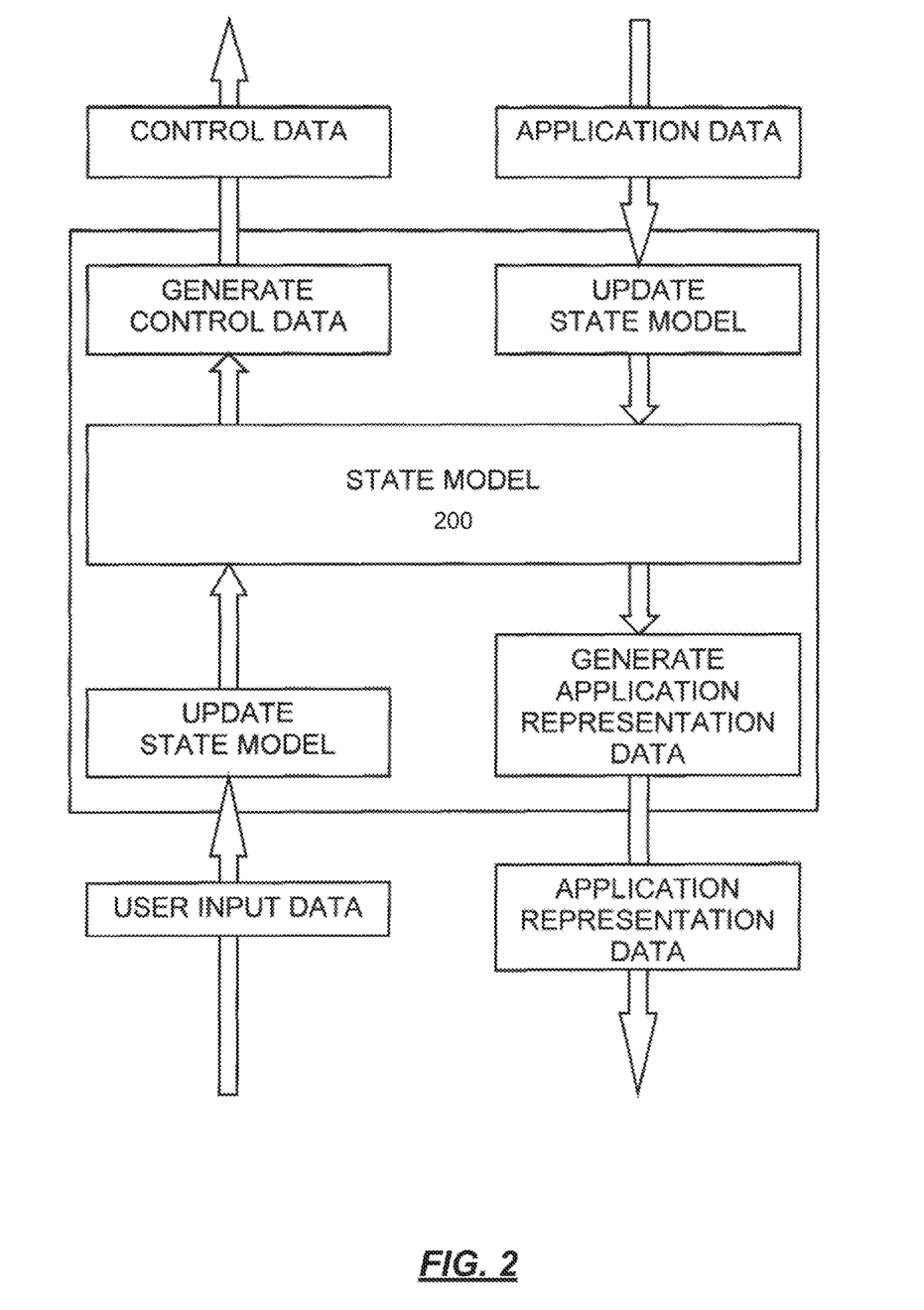
FIG. 2 is a state model in accordance with the present disclosure.

The operation of a server remote access application 111B with the client remote access application (any of 121A, 121B, 121C, 121N, or one of application programs 107B) is performed in cooperation with a state model 200, as illustrated in FIG. 2. An example of the server remote access application is PUREWEB, available from Calgary Scientific, Alberta, Canada. When executed, the client remote access application updates the state model 200 in accordance with user input data received from a user interface program. The remote access application may generate control data in accordance with the updated state model 200, and provide the same to the server remote access application 111B running on the server 102B.

Upon receipt of application data from an application program 107A or 107B, the server remote access application 111B updates the state model 200 in accordance with the screen or application data, generates presentation data in accordance with the updated state model 200, and provides the same to the client remote access application 121A, 121B, 121C, 121N on the client computing device. The state model 200 comprises an association of logical elements of the application program with corresponding states of the application program, with the logical elements being in a hierarchical order. For example, the logical elements may be a screen, a menu, a submenu, a button, etc. that make up the application program user interface. This enables the client device, for example, to natively display the logical elements. As such, a menu of the application program that is presented on a mobile phone will look like a native menu of the mobile phone. Similarly, the menu of the application program that is presented on desktop computer will look like a native menu of the desktop computer operating system.

The state model 200 is determined such that each of the logical elements is associated with a corresponding state of the application program 107A or 107B. The state model 200 may be determined such that the logical elements are associated with user interactions. For example, the logical elements of the application program are determined such that the logical elements comprise transition elements with each transition element relating a change of the state model 200 to one of control data and application representation data associated therewith.

The state model 200 may be represented in, e.g., an Extensible Markup Language (XML) document. Other representations of the state model are possible. Information regarding the application program and the measuring tool are communicated in the state model. The state model 200 may thus contain session information about the application itself, an application extension, information about views, and how to tie the functionality of the application to the specific views.

In some implementations, two or more of the client computing devices 112A, 112B, 112C . . . 112N and/or the server 102B may collaboratively interact with the application program 107A or 107B. As such, by communicating state information between each of the client computing devices 112A, 112B, 112C . . . 112N and/or the server 102B and/or the mainframe computer 102A participating in a collaborative session, each of the participating client computing devices 112A, 112B, 112C . . . 112N may present a synchronized view of the display of the application program 107A or 107B.

In accordance with some implementations, the system 100 may provide for application extensions. Such extensions are provided as part of either the server remote access application 111B, the client remote access applications 121A, 121B, 121C, 121N, or both to provide features and functionalities that are otherwise are not provided by the application programs 107A or 107B. These features and functionalities may be provided without a need to modify the application programs 107A or 107B, as they are integral with the remote access applications.

Figure 3A:
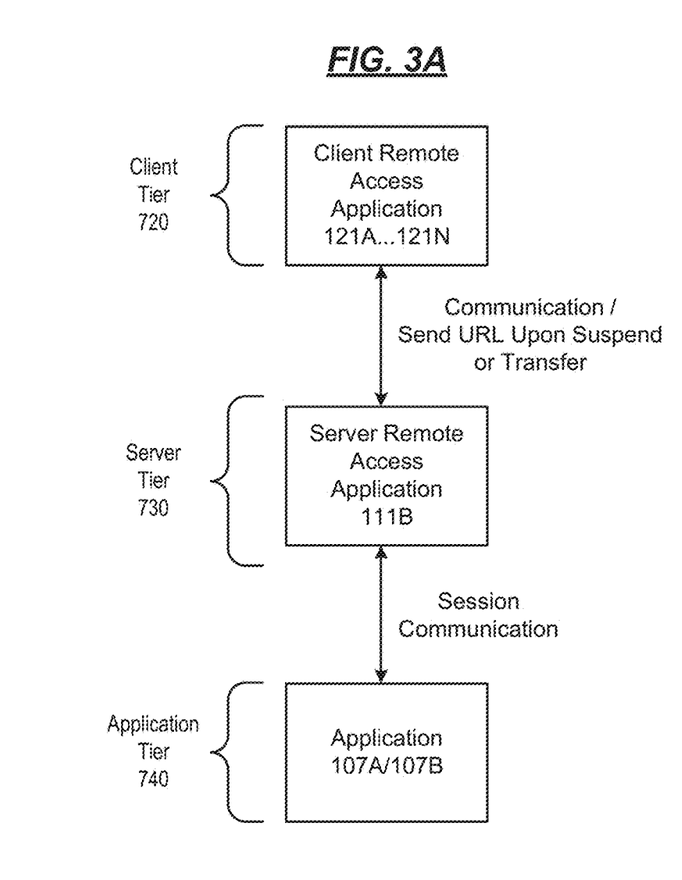
FIGS. 3A-3B illustrate additional aspects of a distributed system.
Figure 3B:
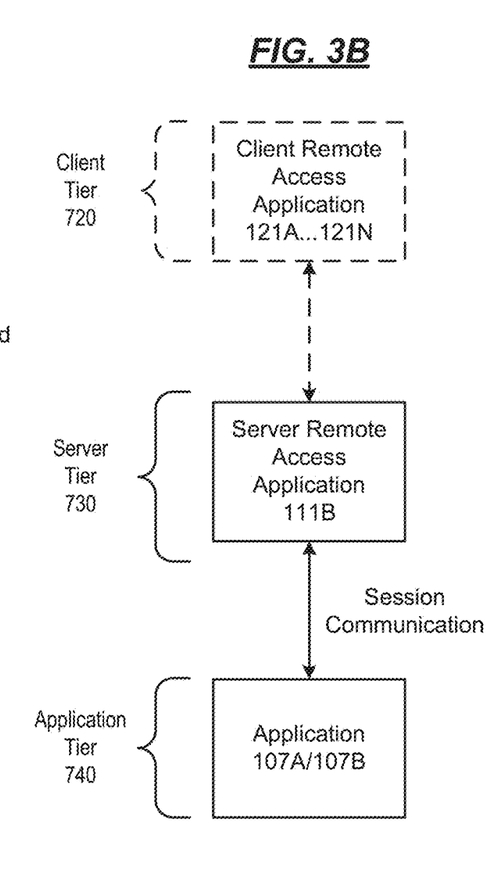

FIGS. 3A and 3B illustrate aspects of a distributed system. As shown in FIG. 3A, the system may have a tiered infrastructure where a client tier 720 and a server tier 730 communicate information, data, messages, etc., between each other. The server tier 730, in turn, communicates the information, data, messages, etc., with an application tier 740. Thus, the server tier 730 may serve as a proxy between the client tier 720 and the application tier 740 during a session between a client (in the client tier 720) and an application (e.g., 107A/107B in the application tier 740).

In accordance with aspects of the present disclosure, the session may be suspended at the server tier 730. The client tier 720 may initiate a transfer or suspend action that is received by the server tier 730. The server tier 730 may then prepare a URL that will be used to resume the session, for example, by the client tier 720 reconnecting with the server tier 730 at the URL. The URL may represent the session as a data structure that the server tier 730 uses to keep track of which client is connected to which service (e.g., application(s) 107A/107B). Any client device may reconnect with the server tier at the URL.

As shown in FIG. 3A, the server tier sends the URL to the client tier 730, where it may be saved or communicated to other devices. The connection to the client tier 730 is then closed. Thus, as shown in FIG. 3B, when the session is suspended, the distributed system no longer includes the client tier 720, but rather the server tier 730 that keeps the session alive with the application tier 740.

Figure 3C:
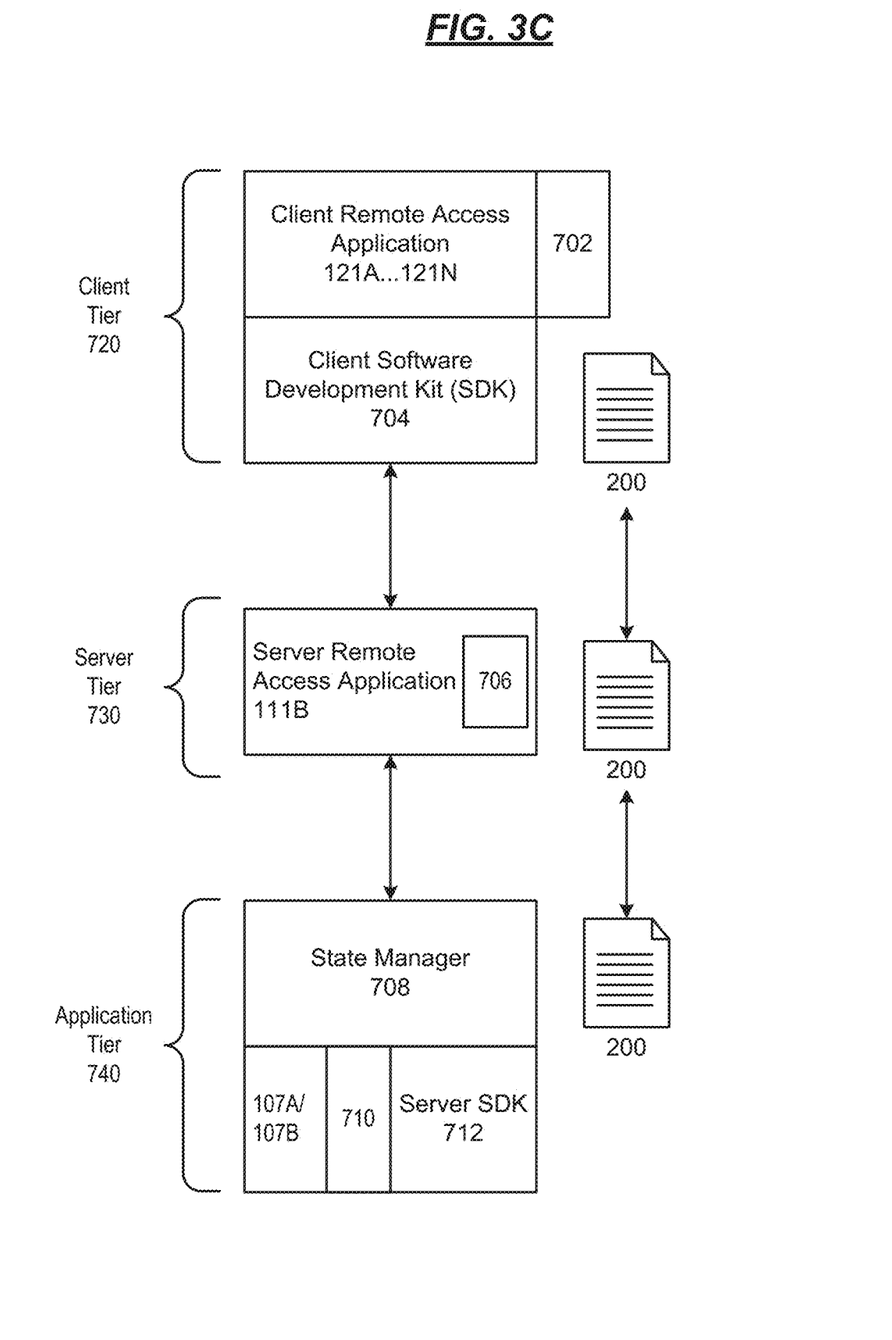
FIG. 3C illustrates aspects of the distributed system as applied to the system of FIG. 1.

FIG. 3C illustrates aspects of the system 100 of FIG. 1 in greater detail as they relate to the distributed system of FIGS. 3A-3B. FIG. 3 illustrates the system 100 as having a tiered software stack. The client remote access application 121A, 121B, 121C, 121N may sit on top of a client software development kit (SDK) 704 in a client tier 720. The client tier 720 communicates to the server remote access application 111B in a server tier 730. The server tier 730 communicates to a state manager 708 sitting on top of the applications 107A/107B and a server SDK 712 in an application tier 740. In accordance with some implementations, application extensions may be implemented in any of the tiers, i.e., within the server tier 730 as a plug-in 706, the client tier 720 as client application extension 702, the application tier 740 as application extension 710, or combinations thereof. The state model 200 is communicated among the tiers and may be modified in any of the tiers by the application extensions 702 and 710, the plug-in 706, the client remote access applications 121A . . . 121N, the server remote access application 111B, and the applications 107A/107B to update create session information contained therein.

Figure 4A:
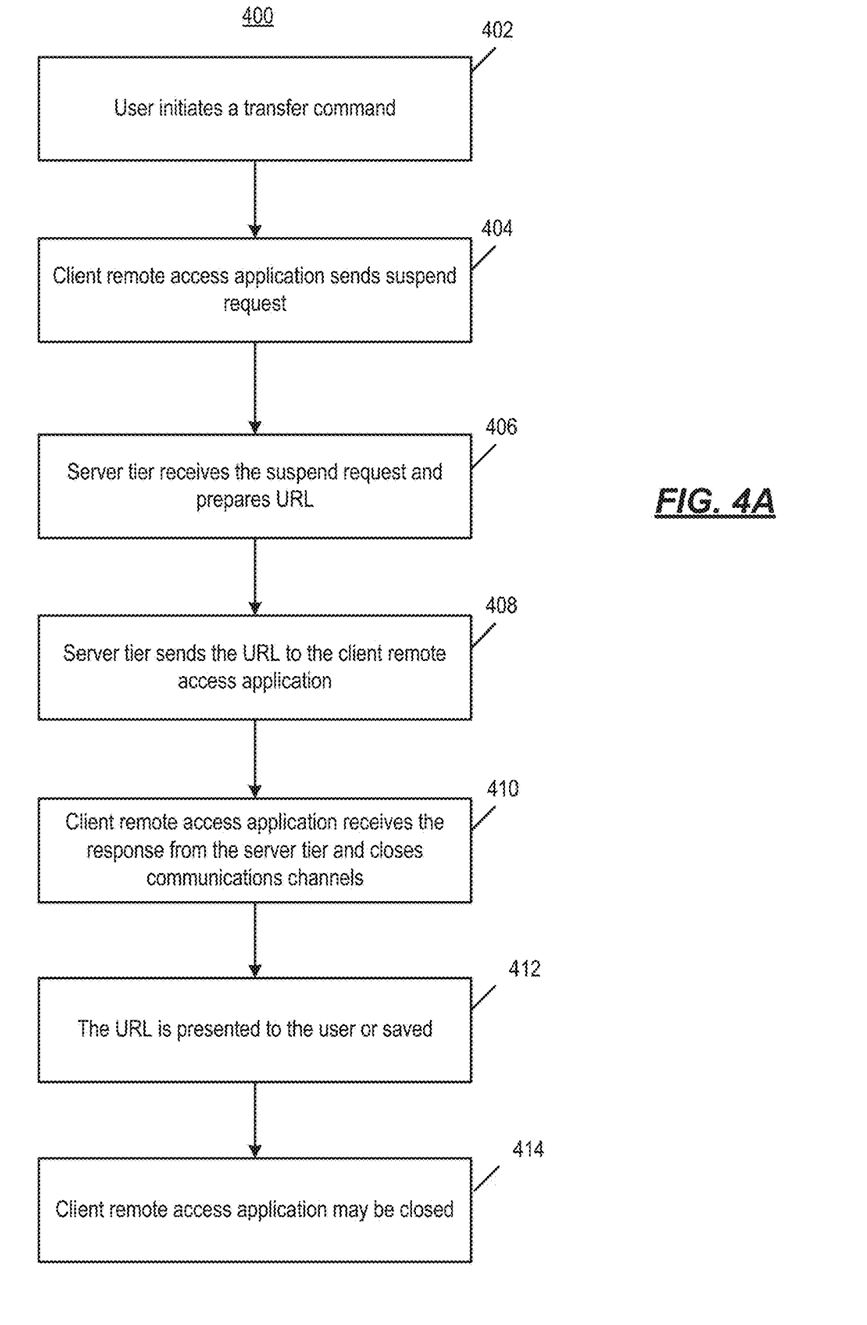
FIG. 4A illustrates an exemplary operational flow diagram of a process to initiate a suspension of a remote access session.

FIG. 4A illustrates an exemplary operational flow diagram 400 of a process to initiate a suspension of a remote access session. As will be described, the suspension may be of the communication between the client remote access application 121A, 121B, 121C, 121N and the server remote access application 111B and/or the suspension of an application (e.g., 107B) at the server 102B. At 402, a user initiates a transfer or suspend command. The transfer or suspend command may be initiated at the client remote access application 121A, 121B, 121C, 121N through a control activated by the user. For example, a transfer or suspend session option may be provided as a menu control activated by a mouse button, a screen tap, etc. The user may also be provided an option to keep a session running on, e.g., the server 102B, whereby communications with the client remote access application 121A, 121B, 121C, 121N is suspended.

At 404, the client remote access application sends the transfer or suspend request to the server tier. For example, the client remote access application 121A, 121B, 121C, 121N may send a request in a communication to the server remote access application 111B running in the server tier 730. Additionally, a password may be provided that is encoded, encrypted, etc. within the request. The password may be any type of authentication mechanism, such as alphanumeric characters, fingerprints, biometric information, etc., to provide a level of security when resuming a session. Additionally, the client remote access application 121A, 121B, 121C, 121N may send its contextual state, such as the current version of the state model 200 to the server tier 730. The contextual state may be consumed by the client remote access application 121A, 121B, 121C, 121N that resumes transferred or suspended session such that the resumed session has the same state as when it was suspended or transferred.

At 406, the server tier receives the transfer or suspend request and prepares a URL that will be used to resume a session. The URL will be used at a later time, for example, by the same or other client remote access application 121A, 121B, 121C, 121N to resume the now-suspended session. Further details of the operations performed by the server tier at 406 are described below with regard to FIGS. 4B and 4C. At 408, the server tier sends the URL to the client remote access application. At 410, the client remote access application receives the response (e.g., URL) from the server tier and closes communications with server remote access application. At 412, the URL is presented to the user. For example, the client remote access application 121A, 121B, 121C, 121N may display the URL such that it may be copied and pasted, forwarded as an e-mail, forwarded as an SMS text, or otherwise saved, etc., such that the URL may be accessed at a later time to resume the suspended session at the same or different client remote access application 121A, 121B, 121C, 121N. At 414, the client remote access application may be closed.

In some implementations, the process at 404 may be automatically performed by the server tier, which may suspend a session without a request from the client if there is a risk of losing a network connection. For example, the server tier may monitor network parameters, such as bandwidth and latency. When a parameter falls below a predetermined threshold, the server tier may suspend a session. A resume URL may be automatically prepared at 406 and communicated to the client remote access application at 408 if the connection is lost and re-established.

Figure 4B:
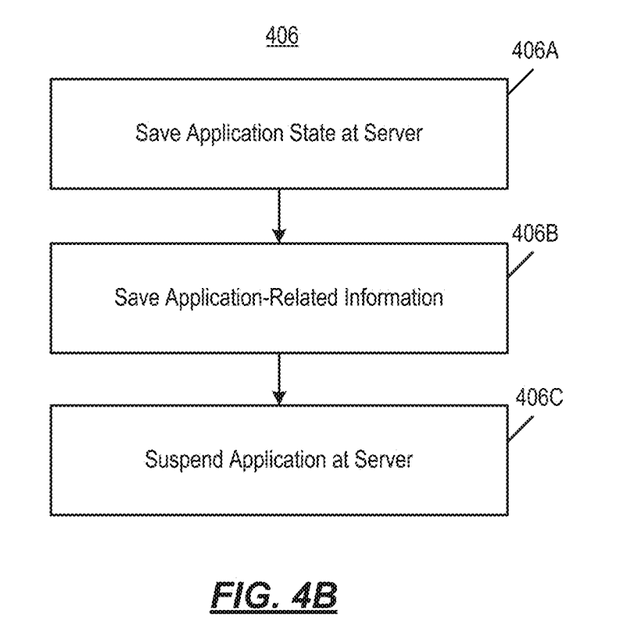
FIG. 4B illustrates an exemplary operational flow diagram of a process performed by a server tier to suspend an application.

FIG. 4B illustrates an exemplary operational flow diagram of a process performed at the server tier to suspend an application at 406 in FIG. 4A. The request to suspend the application (e.g., 107B) may be handled by the server remote access application 111B as an event by, e.g., a session transfer controller in the server remote access application 111B. The event triggers an example sequence that begins at 406A, where the application state is stored at the server tier. For example, a last application state model 200 communicated between the server remote access application 111B in the server tier 730 and client remote access application 121A . . . 121N in the client tier 720 may be saved at the server 102B. The application state model 200 may be stored as an XML data structure keyed to the URL provided to the client computing device 112A, 112B, 112C or 112N that communicated the request to the server 102B to suspend the session. The saved application state model 200 may stored at the server 102B or a shared network location, which would enable any server to access the application state model 200 as part of a restore operation (see, FIG. 5).

At 406B, application-related information may be saved. Application-related information may encompass any information not otherwise included in the state model 200 that may be used to resume the application 107B from a suspended state. For example, such information may include, but is not limited to, logging information, session or temporary data, etc. This data may be stored in a file at the server 102B or network location where the file is also keyed to the URL that is to be used to resume the session. Alternatively, if there is a one-to-one correspondence of applications to servers, a snapshot of the server 102B may be taken to save the application-related information.

At 406C, the application is suspended at the server. For example, the application 107B may be suspended to memory of the server 102B. In some implementations, if the application is suspended for longer than a predetermined period of time, the application 107B may be persisted to non-volatile memory (e.g., a hard disk). In yet other implementations, the application 107B may be left in a running state on the server 102B. In some implementations, a process manager in the server remote access application 111B may create a thread to simulate a connection with the client remote access application 121A . . . 121N. For example, the thread may send periodic keep-alive messages to the client remote access application 121A . . . 121N.

In the operational flow 400 above, the extent to which a session is restored may depend on the information contained in the application state model 200. A developer may determine which aspects of the session may be restored from a suspended session based on the contents within the application state model 200.

Figure 4C:
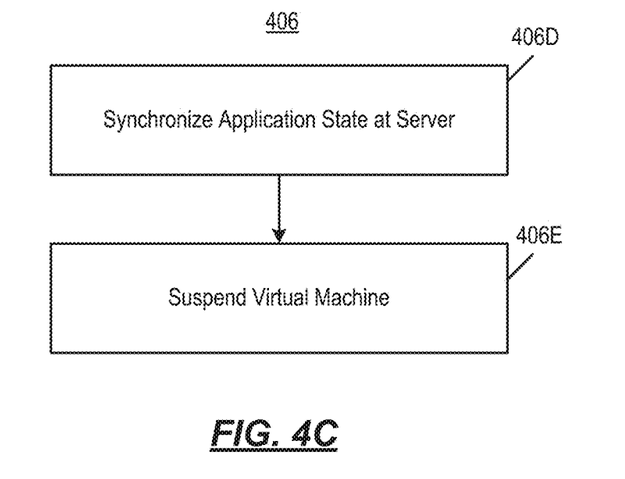
FIG. 4C illustrates another exemplary operational flow diagram of a process performed by the server tier to suspend an application.

FIG. 4C illustrates another exemplary operational flow diagram of a process performed by the server tier to suspend an application state and/or application running in, e.g., a virtual machine. The request to suspend the application (e.g., 107B) may be handled by the server remote access application 111B running in the virtual machine as an event. The event triggers an example sequence that begins at 406D, where the application state mode 200 is synchronized between the client tier and the server tier. At 406E, after the application state model 200 is synchronized, the virtual machine is suspended, thus maintaining the application in a suspended state. As in FIG. 4B, in some implementations, a process manager in the server remote access application 111B may create a thread to simulate a connection with the client remote access application 121A . . . 121N.

Figure 5:
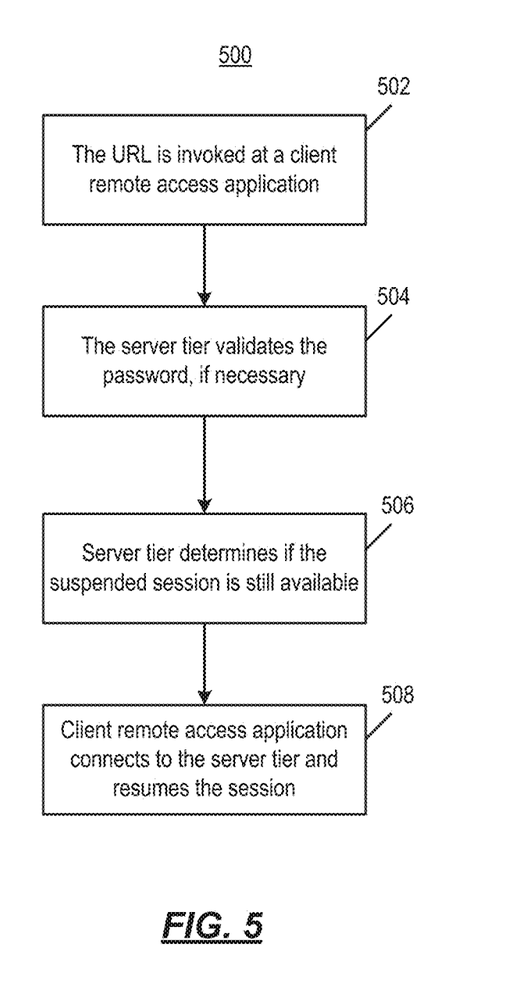
FIG. 5 illustrates an exemplary operational flow diagram to resume a suspended or transferred session.

FIG. 5 illustrates an exemplary operational flow diagram 500 to resume a suspended or transferred session. At 502, a URL is invoked at a client remote access application to resume a suspended or transferred session. The URL may be the URL that was presented to the user at 412 above. When invoking the URL, the client remote access application 121A, 121B, 121C, 121N may also forward the password associated with the suspended session if a password was created at 404. Optionally, the client remote access application 121A, 121B, 121C, 121N may prompt the user for a password such that the URL may be modified to include an encoded version of password for transmission to the server remote access application 111B. Optionally, the server remote access application 111B may present an authorization form to the client remote access application 121A, 121B, 121C, 121N to request the password from the user.

At 504, the server tier validates the password. At 506, the server tier determines if the suspended session is still available. For example, it is possible that the server tier 730 has configurable limits on how long a session may be suspended. If the suspended session is still available, then at 508, the server tier resumes the session by accessing the saved state model 200 and application-related information (if the application 107B is suspended in accordance with FIG. 4B) or by accessing the saved state model 200 and powering on the virtual machine (if the application 107B is suspended in accordance with FIG. 4C). The client remote access application 121A, 121B, 121C, 121N may then connect to the server tier and to resume the session. If a contextual state was sent with the original transfer or suspend request at 404, then the server tier 730 will retrieve the contextual state and forwarded it to the client remote access application 121A, 121B, 121C, 121N to enable the client remote access application 121A, 121B, 121C, 121N to configure itself appropriately.

Thus, as described above, the operational flows 400 and 500 provide a mechanism to suspend, transfer and resume a remote access session.

The above operational flows 400 and 500 may also facilitate remote access to applications on client devices that do not perform true multitasking of multiple applications at the same time, such as the client device 112A. In these types of devices, such as those that execute the iOS operating system, an application is suspended in memory while another application runs in the foreground. While an application running on an iOS device is suspended, it is not able to execute code related to maintaining the network connection between the client remote access application 121A and the server tier 730. When the suspended client remote access application 121A is resumed, the connection to the server tier 730 is often lost. Thus, the user must reconnect and start their interaction with the remote application 107A/107B from the beginning or from her last explicit "save" point. In such an example, each of steps 402-414 may be executed as described above by the client device itself without any user interaction. For example, at 402 the client device 112A may initiate the suspend command that is sends to the server tier at 402. At 412, the client device 112A may store the URL locally in the memory 120A. With regard to steps 502-508, the client device may invoke the URL at 502 by retrieving it from the memory location in which it is saved.

Further, as noted above, two or more of the client computing devices 112A, 112B, 112C . . . 112N and/or the server 102B may be collaboratively interacting with the application 107B. Suspending the application 107B will have the effect of stopping the session for all participants. When the application 107B is suspended the URL communicated at 408 may be forwarded to the owner of the collaborative session, selected participants in the collaborative session, or all participants in the collaborative session. As such, the collaborative session may be resumed by an owner of the session or any one of the (selected) participants. If someone other than the owner resumes the session, the user who resumes the session may become the owner of the collaborative session. The system 100 may verify user access credentials to resume the session or the credentials may be embedded and passed with the URL.

Figure 6A:
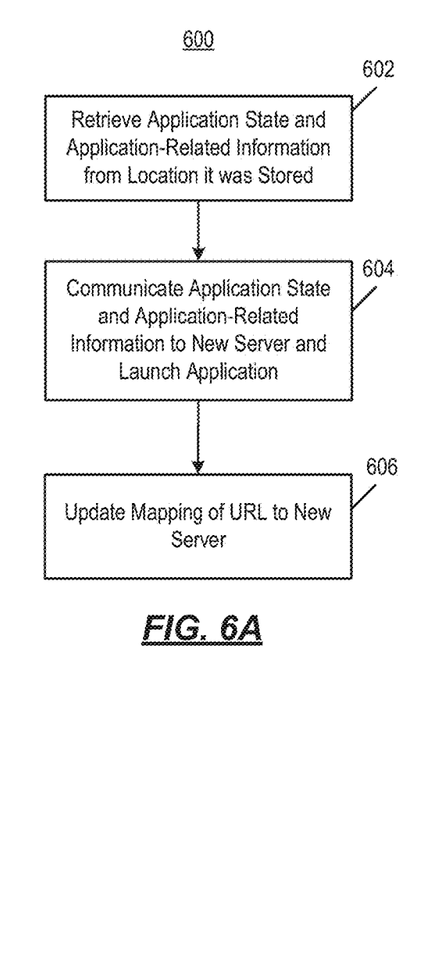
FIG. 6A illustrates an operational flow diagram to migrate a suspended or transferred session from one server to another server.

FIG. 6A illustrates an operational flow diagram 600 to migrate a suspended or transferred session from one server to another server. In accordance with the above, the application (e.g., 107B) may be migrated to a new server, particularly if deployed in a cloud environment where the server pool is dynamically allocated/deallocated on demand. As such, at 602, the application state model 200 and other application-related information may be retrieved from a location where the information is stored. This location could be on the server 102B, a networked location, or other. At 604, the application state model 200 and other application-related information may then be communicated to a new server. The application state model 200 and other application-related information is used to launch the application such that it is resumed from the previous state. At 606, mapping associated with the URL that was provided at, e.g., 406 may be updated to reflect the address of the new server. As such, the migration of the application 107B from a current server to a new server is transparent to the end user of the client computing device 112A . . . 112N when resuming the application 107B from a suspended state.

Figure 6B:
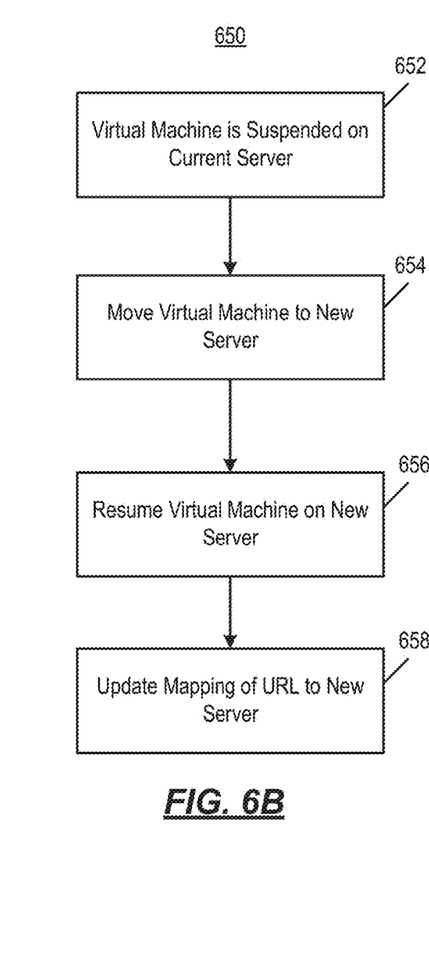
FIG. 6B illustrates operational flow diagram to migrate a suspended or transferred session from one virtual machine to another virtual machine.

FIG. 6B illustrates an operational flow diagram 650 to migrate a suspended or transferred session via virtual machine suspension and potential migration to another physical server. At 652, the virtual machine in which the application to be migrated is executing is suspended at a current server. At 654, the virtual machine is moved to a new server. At 656, the virtual machine is resumed at the new server. At 658, mapping associated with the URL that was provided at, e.g., 406 may be updated to reflect the address of the new virtual machine. As such, the migration of the application 107B from a current virtual machine to a new virtual machine is transparent to the end user of the client computing device 112A . . . 112N when resuming the application 107B from a suspended state.

Figure 7:
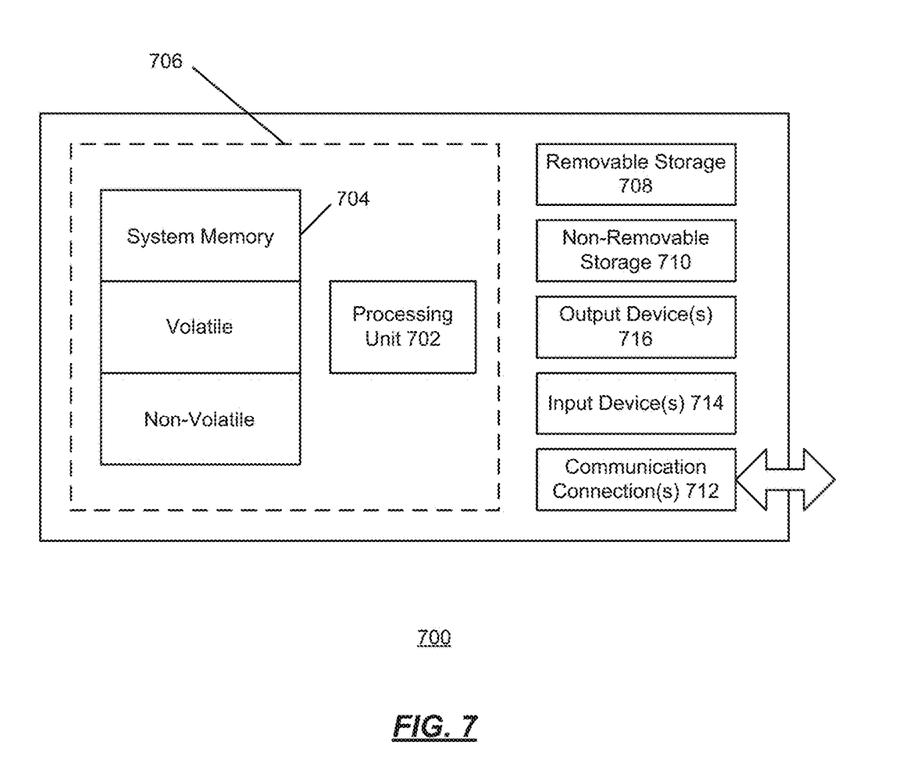
FIG. 7 illustrates an exemplary computing device.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of tangible computer readable media. Computer readable media can be any available media that can be accessed by device 700 and includes both volatile and non-volatile media, removable and non-removable media.

Computer storage media include tangible volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to tangible media such as RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device.

One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for migrating a virtual machine from a first server to a second server, the virtual machine being accessible by a client computing device over a network, the method comprising:
   suspending the virtual machine at the first server;
   saving application state information associated with an application executing on the virtual machine when suspending the virtual machine;
   moving the virtual machine from the first server to the second server;
   updating a mapping of a Uniform Resource Locator (URL) used to resume the virtual machine to an address associated with the second server; and
   subsequent to the updating, receiving a request from the client computing device at the URL to resume the virtual machine.

2. The method of claim 1, wherein the URL includes a data structure representing a session between the client computing device and the virtual machine.

3. The method of claim 2, further comprising using the URL to associate the client computing device to the virtual machine.

4. The method of claim 1, further comprising saving application-related information associated with the virtual machine when moving the virtual machine to the second server.

5. The method of claim 1, further comprising resuming the application using the application state information.

6. The method of claim 1, further comprising authenticating the request at the URL using a password provided by the client computing device.

7. A method to migrate a virtual machine, comprising:
   suspending a virtual machine at a first server, the virtual machine executing an application that is remotely accessed by a client device over a network;
   moving the virtual machine from the first server to a second server, the second server being accessible by the client device over the network;
   updating a mapping associated with a Uniform Resource Locator (URL) used to resume the virtual machine to an address associated with the second server; and
   subsequent to the updating, receiving a request from the client computing device at the URL to resume the virtual machine and to resume the application using saved application-related information associated with the application.

8. The method of claim 7, wherein the URL is a data structure representing a session between the client computing device and the application executing on the virtual machine.

9. The method of claim 8, further comprising using the URL to associate the client computing device to the application executing on the virtual machine.

10. The method of claim 9, further comprising resuming the application using application state information.

11. The method of claim 7, further comprising authenticating the request at the URL using a password provided by the client computing device.

12. A tangible computer readable media containing computer-executable instructions that when executed by a computing device perform migration of a virtual machine from a first server to a second server, the virtual machine being accessible by a client computing device over a network, the instructions performing a method comprising:
   suspending the virtual machine at the first server;
   saving application state information associated with an application executing on the virtual machine when suspending the virtual machine;
   moving the virtual machine from the first server to the second server;
   updating a mapping of a Uniform Resource Locator (URL) used to resume the virtual machine to an address associated with the second server; and
   subsequent to the updating, receiving a request from the client computing device at the URL to resume the virtual machine.

13. The computer readable media of claim 12, wherein the URL includes a data structure representing a session between the client computing device and the virtual machine.

14. The computer readable media of claim 13, further comprising instructions for using the URL to associate the client computing device to the virtual machine.

15. The computer readable media of claim 12, further comprising instructions for resuming the application using the application state information.

16. The computer readable media of claim 12, further comprising instructions for authenticating the request at the URL using a password provided by the client computing device.

* * * * *